(12) United States Patent
Sanson et al.

(10) Patent No.: US 6,243,212 B1
(45) Date of Patent: Jun. 5, 2001

(54) TELECENTRIC ZOOM LENS

(75) Inventors: Mark C. Sanson, East Rochester, NY (US); J. Robert Zinter, Rochester, NY (US)

(73) Assignee: Amarel Precision Instruments, Inc., Fairport, NY (US)

( * ) Notice: Subject to any disclaimer, the term of this patent is extended or adjusted under 35 U.S.C. 154(b) by 0 days.

(21) Appl. No.: 09/364,673

(22) Filed: Jul. 30, 1999

(51) Int. Cl.[7] ............................. G02B 15/14; G02B 13/32
(52) U.S. Cl. ......................... 359/676; 359/692; 359/663
(58) Field of Search ................................. 359/663, 680, 359/681, 682, 686–692, 676–679

(56) References Cited

U.S. PATENT DOCUMENTS

| | | |
|---|---|---|
| 3,918,798 | 11/1975 | Takano . |
| 4,249,805 * | 2/1981 | Hilbert ................................. 352/85 |
| 4,281,906 | 8/1981 | Tanaka . |
| 4,386,828 | 6/1983 | Hirose . |
| 4,444,472 | 4/1984 | Tanaka . |
| 4,591,244 | 5/1986 | Aono et al. . |
| 4,637,690 * | 1/1987 | Miyamae ............................. 350/427 |
| 4,867,545 | 9/1989 | Wakimoto et al. . |
| 4,978,212 | 12/1990 | Hazard . |
| 5,253,106 | 10/1993 | Hazard . |
| 5,500,770 | 3/1996 | Zinter et al. . |
| 5,526,186 | 6/1996 | Sekine . |
| 5,600,490 | 2/1997 | Sugawara et al. . |
| 5,764,419 | 6/1998 | Kodama et al. . |
| 5,790,316 | 8/1998 | Terasawa et al. . |
| 5,805,347 | 9/1998 | Mizutani et al. . |
| 6,025,962 | 2/2000 | Suzuki . |
| 6,075,653 | 6/2000 | Narimatsu, et al. . |

FOREIGN PATENT DOCUMENTS

| | | |
|---|---|---|
| 0297361 | 1/1989 | (EP) . |
| 11095098 | 4/1999 | (EP) . |
| 10111456 | 4/1998 | (JP) . |
| 10123418 | 5/1998 | (JP) . |

* cited by examiner

*Primary Examiner*—Georgia Epps
*Assistant Examiner*—Michael A. Lucas
(74) *Attorney, Agent, or Firm*—Harter, Secrest & Emery LLP; Brian B. Shaw, Esq.; Stephen B. Salai, Esq.

(57) ABSTRACT

A telecentric zoom lens having telecentric forming aperture optically and preferably mechanically intermediate an objective lens and a zoom group. The aperture is fixed along an optical axis and selected to provide a constant speed on an image side of the lens system. The location of the aperture relative to the zoom group maintains telecentricity of the lens in object space.

17 Claims, 10 Drawing Sheets

TELECENTRIC ZOOM LENS

FIELD OF THE INVENTION

The present invention relates to zoom lenses and more particularly, to a telecentric zoom lens having a telecentric forming aperture mechanically intermediate an objective lens and a zoom group.

BACKGROUND OF THE INVENTION

Telecentric optical systems are often employed in a measuring projector. The measuring projector allows a measurement of various values by illuminating the profile of an object to be measured, projecting the profile onto a screen, enlarging the projected image by a projection optical system and comparing the projection with a reference figure on the screen. For such systems, it is preferable that the projection be telecentric. That is, a principal ray passes through the optical system parallel with the optical axis.

However, the need exists for a telecentric zoom lens system having a reduced level of distortion in low tolerance applications. A further need exists for a telecentric zoom lens that has inherent color correction and reduced aberrations. A need also exists for a telecentric zoom lens that provides a constant speed on an image side of the lens. The need also exists for a method and apparatus of constructing such a telecentric zoom lens.

SUMMARY OF THE INVENTION

The present invention provides a telecentric zoom lens having a constant speed on an image side of the lens. Generally, the telecentric zoom lens includes a plurality of optical elements located along an optical axis. The optical elements include an objective lens having an object side and an image side; a zoom group moveable along the optical axis; and a telecentricity forming aperture mechanically intermediate the objective lens and the zoom group and thus optically intermediate the objective lens and the zoom group. Thus, the lens is telecentric in object space. In a further configuration, it is contemplated that the telecentricity forming aperture is a variable aperture. It is also contemplated, the telecentric zoom lens may include a first decollimator optically intermediate the objective lens and the telecentricity forming aperture.

More particularly, the present telecentric lens system includes a plurality of optical elements located on the optical axis, and specifically, a first collimator; a first decollimator, a zoom lens group, a second collimator, second decollimator, and a variable aperture optically intermediate the first decollimator and the zoom group. Further, it is contemplated that the zoom group may include a variator and a compensator.

DETAILED DESCRIPTION OF THE PREFERRED EMBODIMENT

Figure 1:
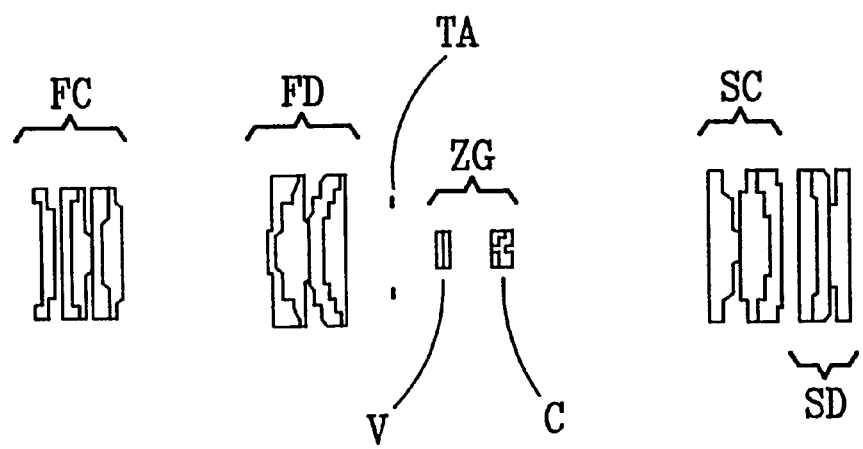
FIG. 1 is a side elevational view of a first configuration of the lens system in a first position.
Figure 2:
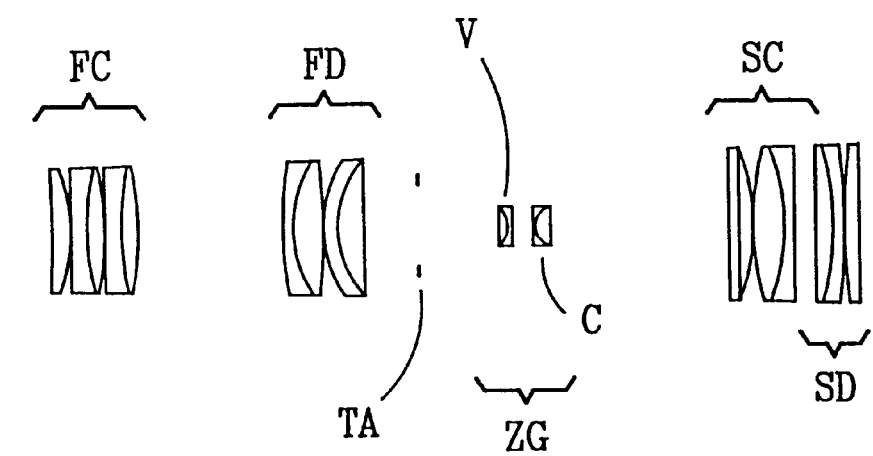
FIG. 2 is a side elevational view of a first configuration of the lens system in a second position.
Figure 3:
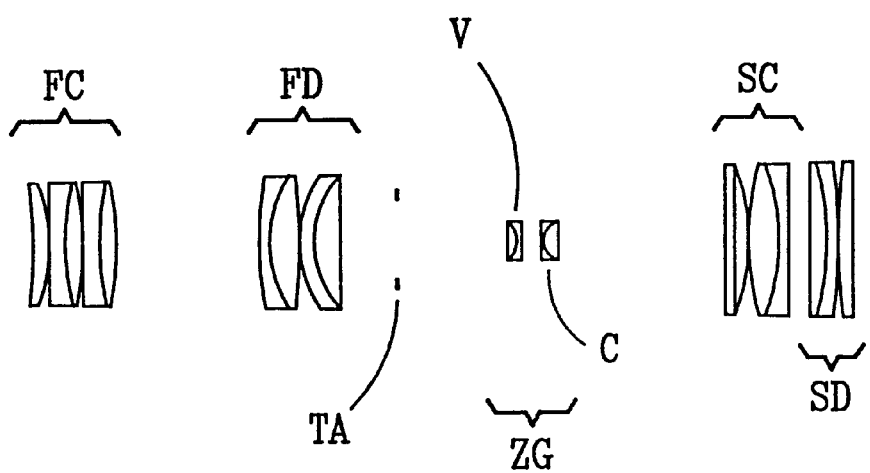
FIG. 3 is a side elevational view of a first configuration of the lens system in a third position.
Figure 4:
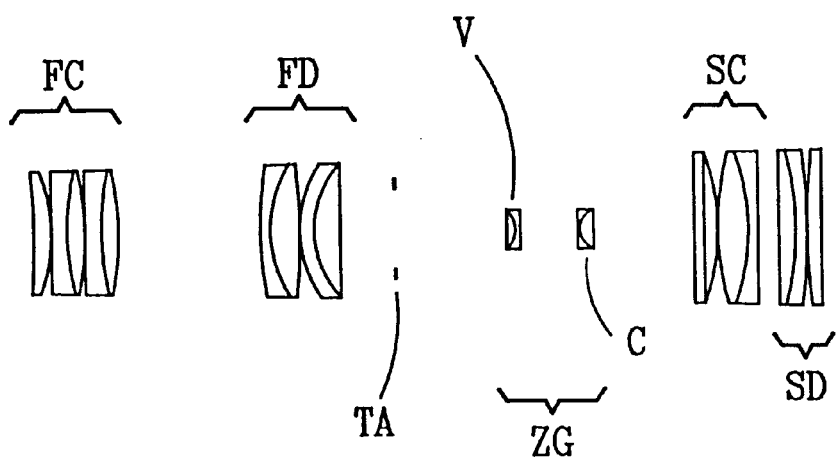
FIG. 4 is a side elevational view of a first configuration of the lens system in a fourth position.
Figure 5:
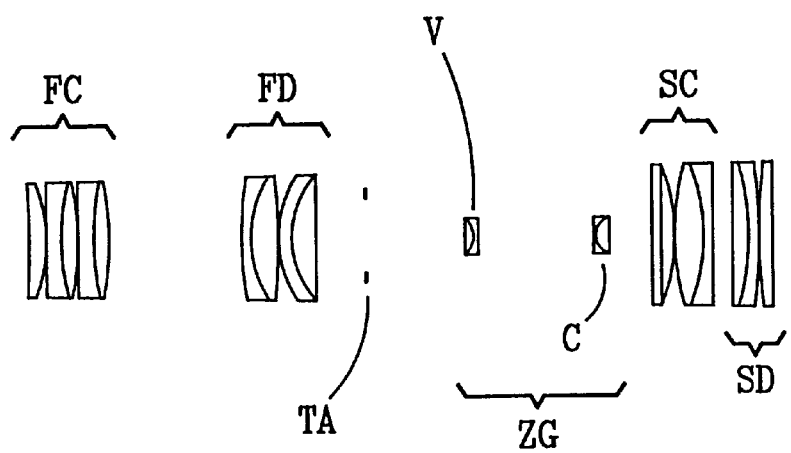
FIG. 5 is a side elevational view of a first configuration of the lens system in a fifth position.
Figure 6:
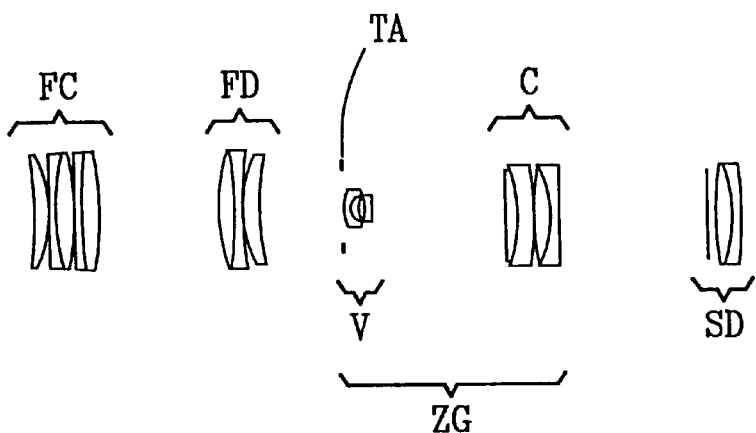
FIG. 6 is a side elevational view of a second configuration of the lens system in a first position.
Figure 7:
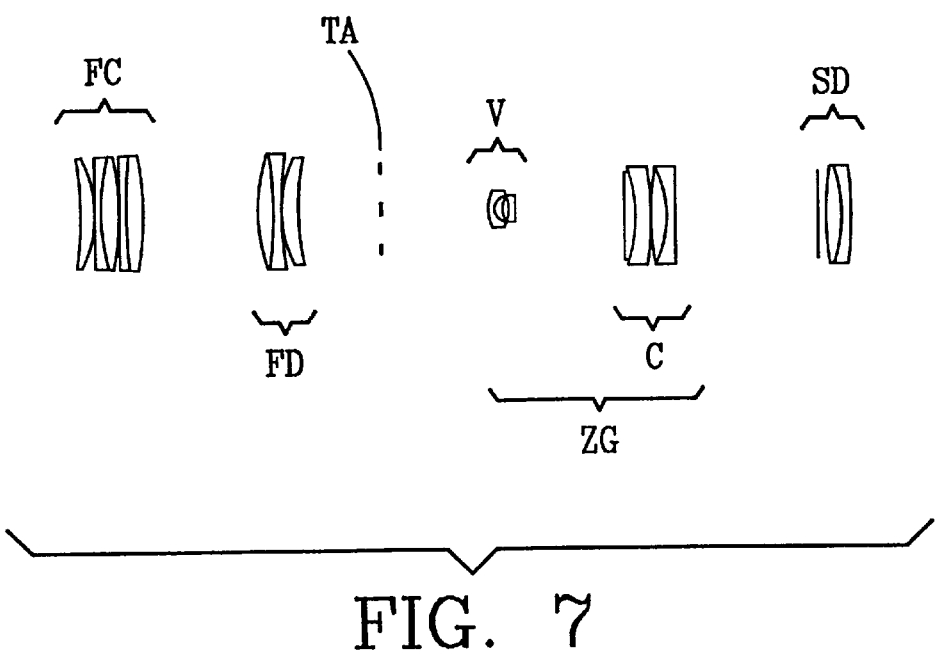
FIG. 7 is a side elevational view of a second configuration of the lens system in a second position.
Figure 8:
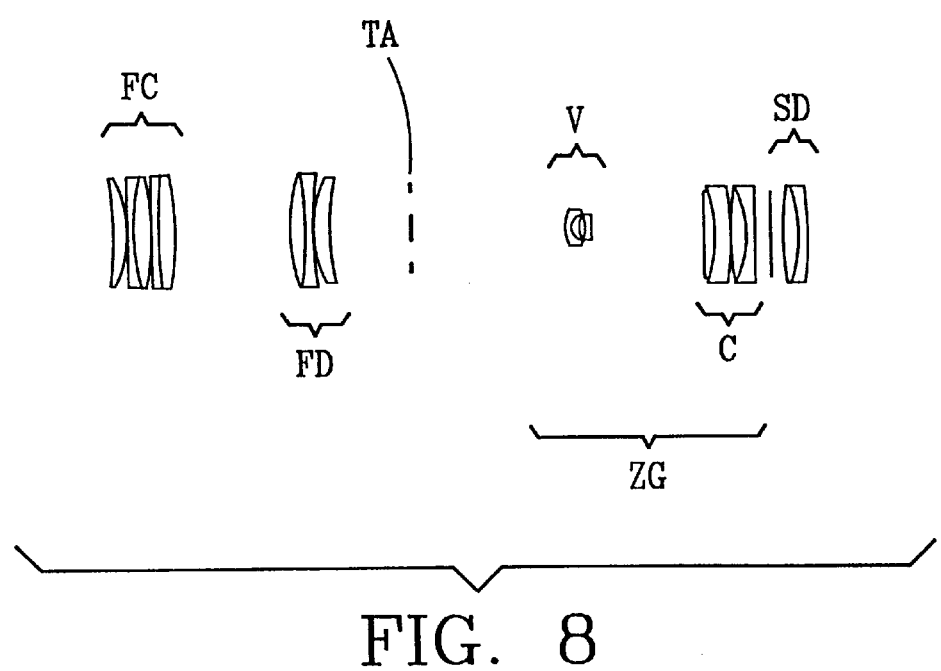
FIG. 8 is a side elevational view of a second configuration of the lens system in a third position.
Figure 9:
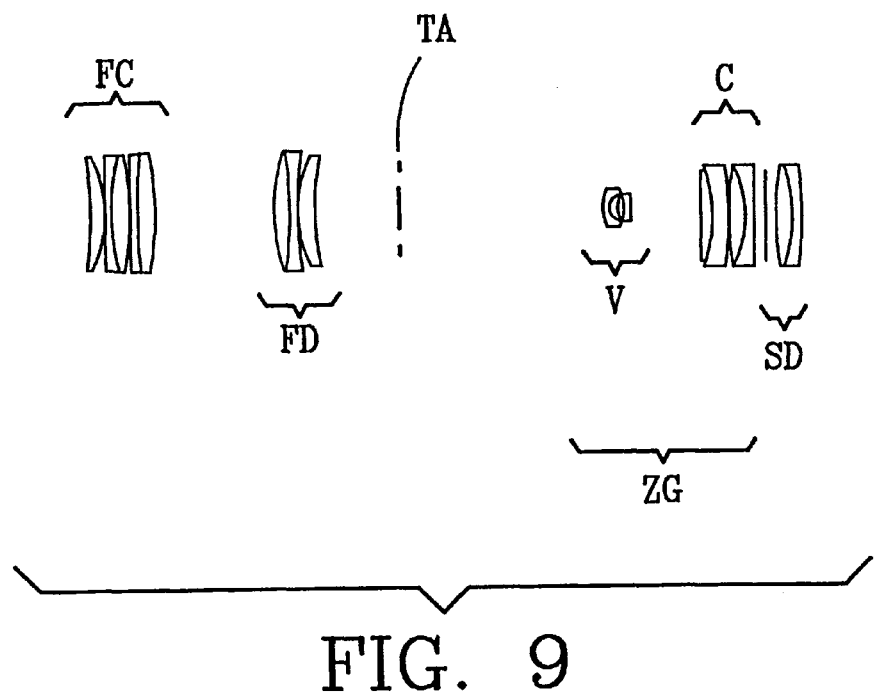
FIG. 9 is a side elevational view of a second configuration of the lens system in a fourth position.
Figure 10:
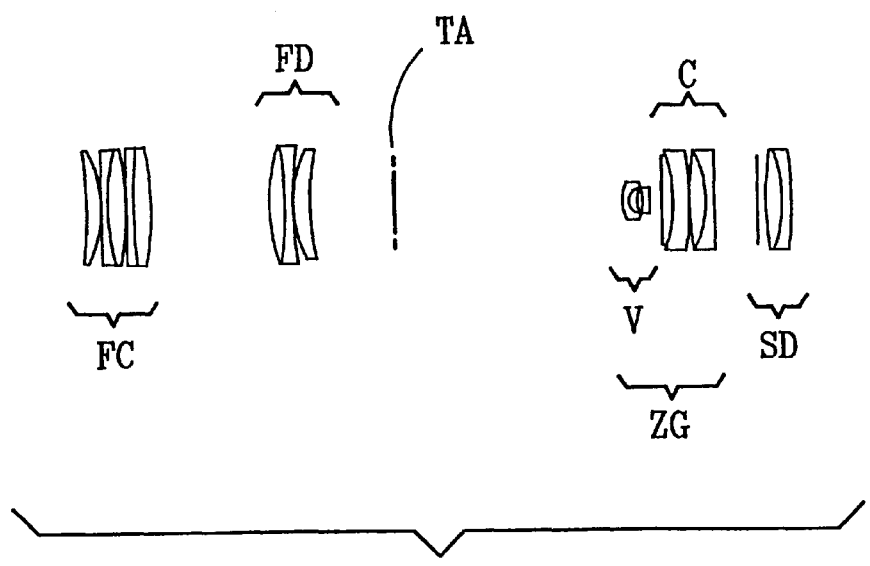
FIG. 10 is a side elevational view of a second configuration of the lens system in a fifth position.
Figure 11:
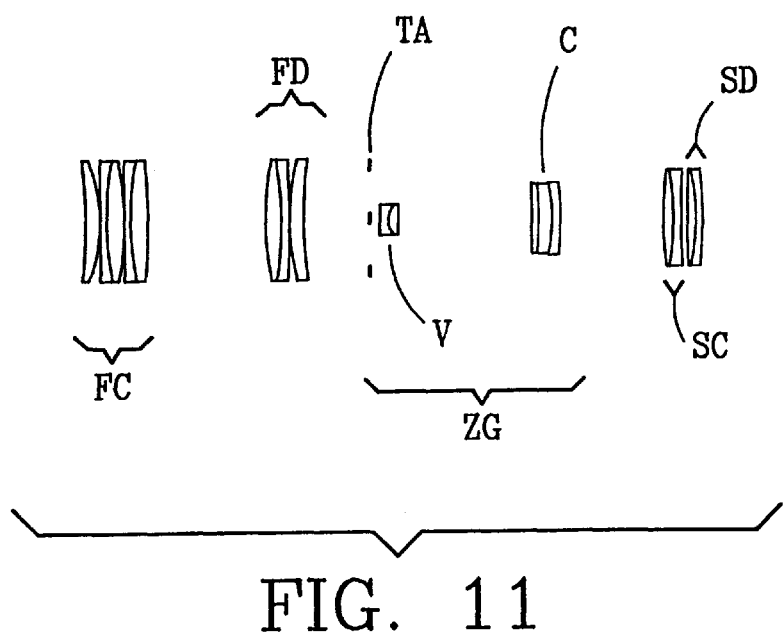
FIG. 11 is a side elevational view of a third configuration of the lens system in a first position.
Figure 12:
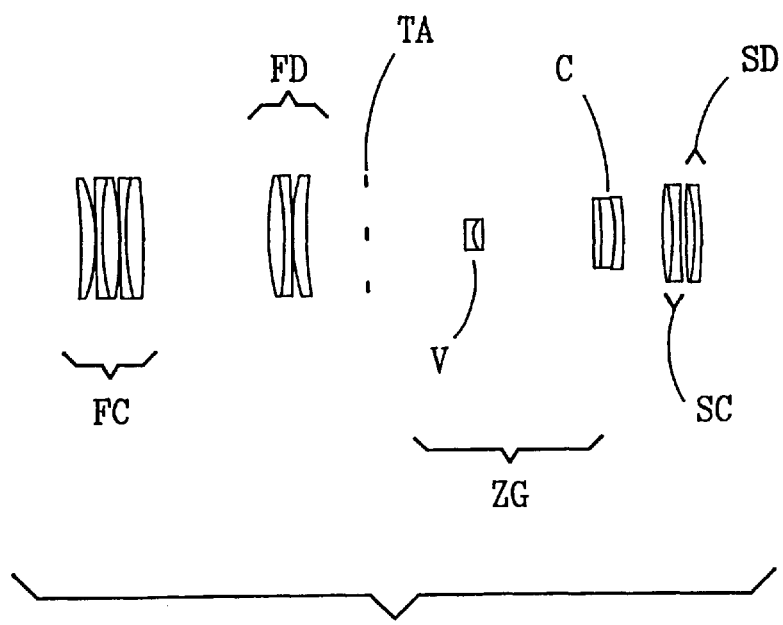
FIG. 12 is a side elevational view of a third configuration of the lens system in a second position.
Figure 13:
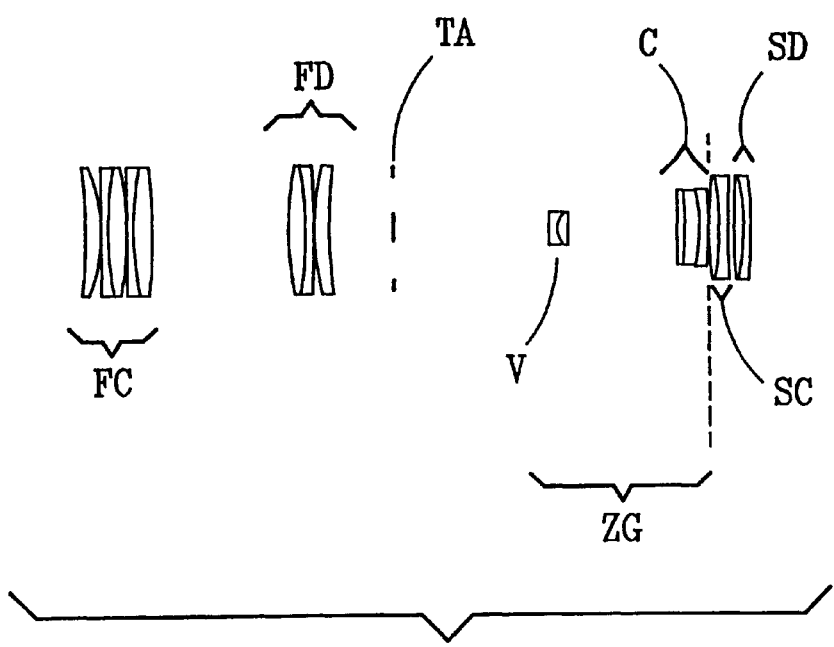
FIG. 13 is a side elevational view of a third configuration of the lens system in a third position.
Figure 14:
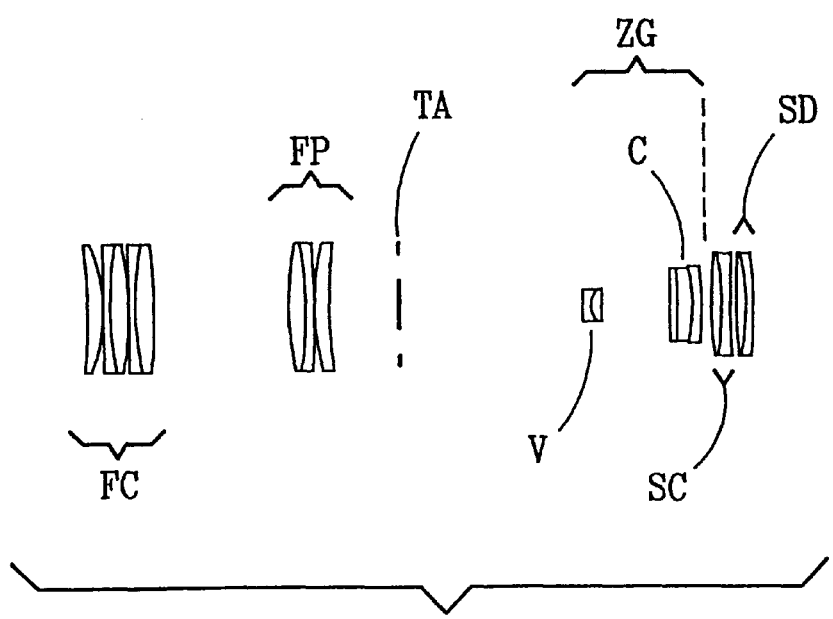
FIG. 14 is a side elevational view of a third configuration of the lens system in a fourth position.
Figure 15:
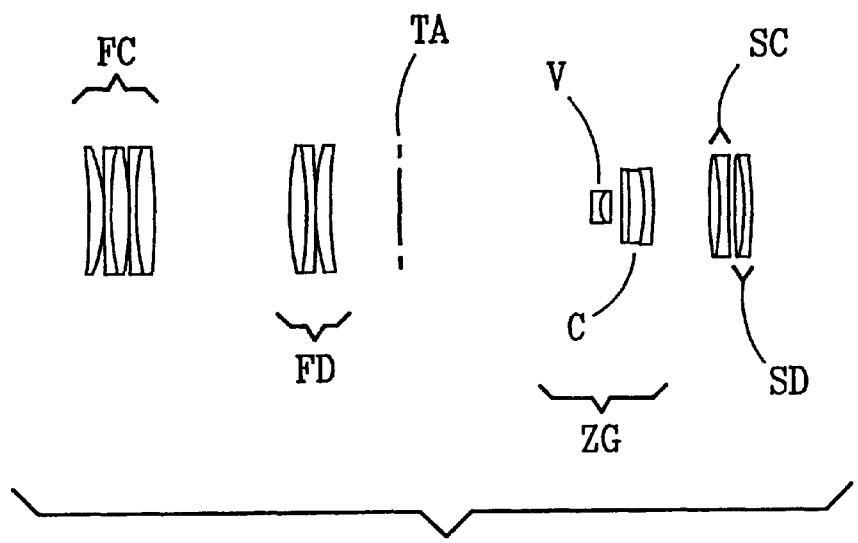
FIG. 15 is a side elevational view of a third configuration of the lens system in a fifth position.
Figure 16:
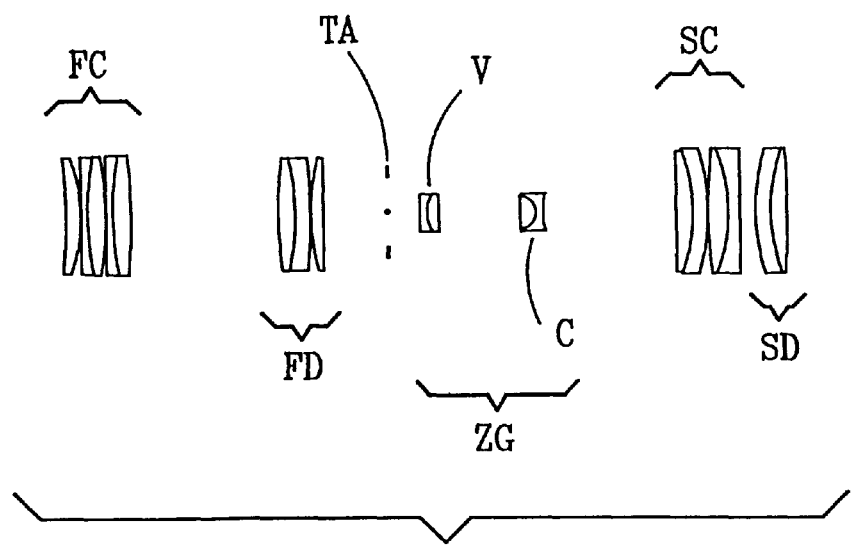
FIG. 16 is a side elevational view of a fourth configuration of the lens system in a first position.
Figure 17:
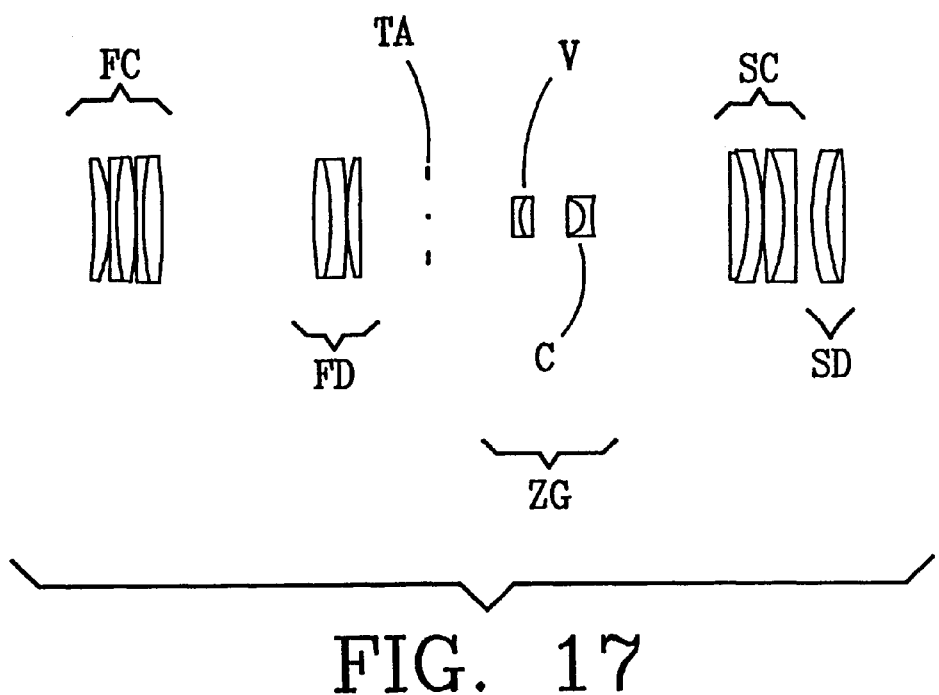
FIG. 17 is a side elevational view of a fourth configuration of the lens system in a second position.
Figure 18:
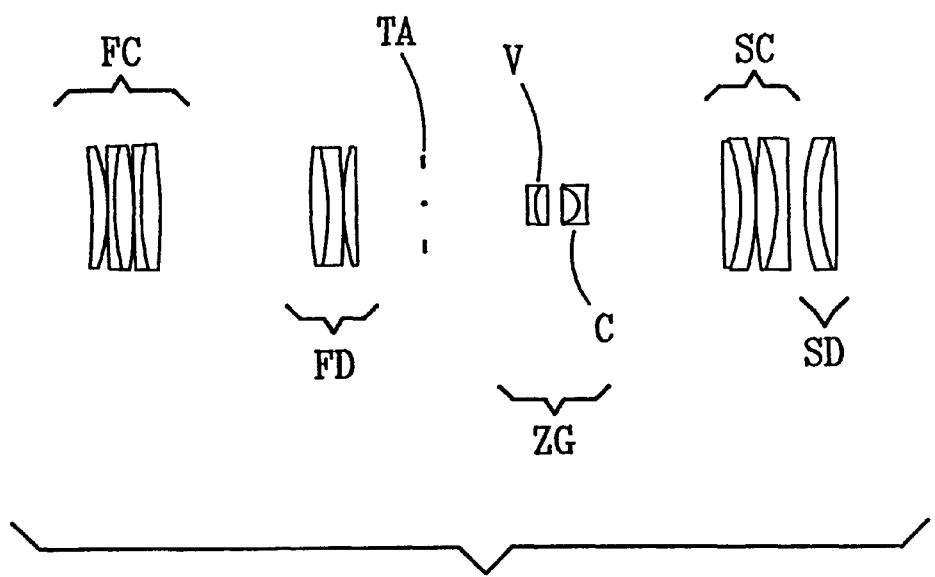
FIG. 18 is a side elevational view of a fourth configuration of the lens system in a third position.
Figure 19:
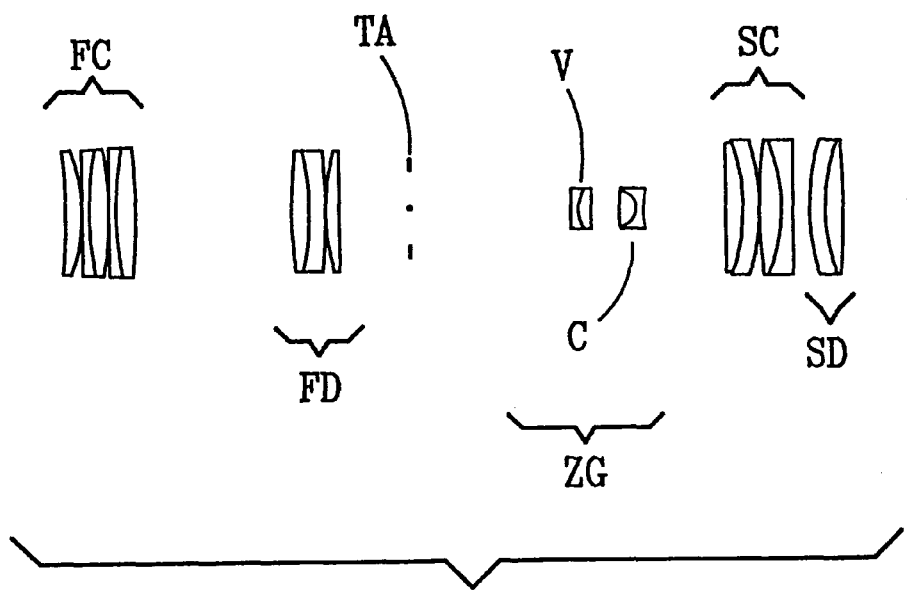
FIG. 19 is a side elevational view of a fourth configuration of the lens system in a fourth position.
Figure 20:
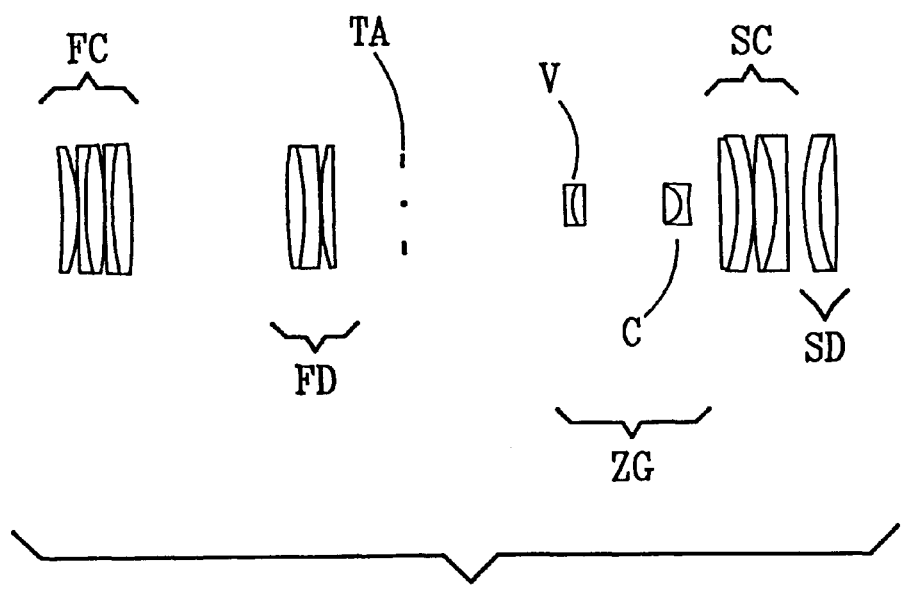
FIG. 20 is a side elevational view of a fourth configuration of the lens system in a fifth position.

Referring to FIG. 1, the present invention includes a telecentric zoom lens. For purposes of the description, the term "object" or "front side" of an optical element is used to describe those elements or surfaces that are nearer to the viewed object. The term "image" or "rear side" is used to describe those sides or surfaces of the optical element that are nearer the image that passes through the lens system. The term telecentric generally means a parallel relationship between the optical axis of the optical system and a principal ray entering or exiting the optical system.

The telecentric zoom lens includes a plurality of optical elements disposed along an optical axis A. The telecentric zoom lens includes an objective lens and a zoom group. The telecentric zoom lens system may include a first collimator FC, a first decollimator, FD a zoom group, ZG a second collimator SC, and a second decollimator SD along the optical axis.

The objective lens is the first collimator. The first collimator may be defined by variety of optical surfaces, as set forth in Tables 1–4. The first collimator causes the rays from an on axis point in the object plane to orient substantially parallel to the optical axis.

The first decollimator is disposed along the optical axis on the image side of the objective lens. The first decollimator causes the rays to converge on the image side of the first decollimator.

A telecentric aperture TA is located along the optical axis rearward of the first decollimator and located at a fixed position along the optical axis. The telecentric aperture is preferably variable. The range of variance in the telecentric aperture TA is sufficient to provide a constant speed on the image side. The variable telecentric-causing aperture TA may be any of a variety of aperture varying mechanisms such as leaves, plates or diaphragms. Either a motor or cam controls actuation of the variable aperture. By employing a variable aperture it has been found the speed of the lens system on the image side can be controlled.

The zoom group is located along the optical axis rearward of the telecentric aperture. The telecentric causing aperture is optically intermediate the zoom group and the objective lens. Although the telecentric causing aperture is also shown as mechanically and physically intermediate the zoom group and the objective lens, it is contemplated that the physical location of the telecentric causing aperture may be changed while retaining its being optically intermediate the objective lens and the zoom group. Although the zoom group may have a variety of configurations, it is contemplated the zoom group includes a variator and a compensator. The zoom group may be any combination of negative and positive elements. That is, the variator may be negative and the compensator negative; the variator negative and the compensator positive; the variator positive and the compensator negative; and the variator positive and the compensator positive. Configuration 1 & 4, wherein the variator is negative and the compensator is negative, and configuration 2 & 3 wherein the variator is negative and the compensator is positive are preferred. Representative optical services of the variator and compensator parameters are set forth in Tables 1–4.

Relative motion of the zoom group components may be accomplished by any of a variety of known mechanisms such as stepper motors and linear actuators. A preferred mechanism is a mechanical cam.

The second collimator is optically rearward of the zoom group and specifically the compensator. Configurations 1, 3 and 4 include the second collimator. The second configuration does not include the second collimator as the output from the zoom group (compensator) is collimated. Preferably, the second collimator is constructed to reduce distortion.

The second decollimator is on the image side of the second collimator. Each of the four configurations includes a second decollimator. The second decollimator focuses the light to the image plane.

The optical elements may be formed from any appropriate material including plastics, resins as well as, glass and composites. A preferred material is glass.

It is further contemplated that each air interface surface of the lens elements may be provided with an anti-reflective coating. Typical anti-reflective coatings include magnesium fluoride. The objective lens may have a broadband anti-reflective coating.

Configuration 1 includes a negative-negative zoom group with a working f-number 20 in a camera format of ½ inch.

In the first configuration, surfaces 1 to 8 are the first collimator FC, surfaces 9 to 14 are the first decollimator FD, surfaces 16 to 18 are the variator V in zoom group, surfaces 19–21 are the compensator C in the zoom group, surfaces 22 to 26 are the second collimator SC and surfaces 27 to 31 are the second decollimator SD.

| Surface | Radius | Thickness | Nd | V# | Diameter |
|---|---|---|---|---|---|
| OBJ |  | 77.19 |  |  |  |
| 1 | −281.5500 | 4.00 | 1.45600 | 90.34 | 32.00 |
| 2 | −57.2600 | 0.50 |  |  | 33.00 |

-continued

| Surface | Radius | Thickness | Nd | V# | Diameter |
|---|---|---|---|---|---|
| 3 | Infinity | 3.80 | 1.61310 | 44.36 | 34.00 |
| 4 | 103.6500 | 4.25 | 1.45600 | 90.34 | 34.00 |
| 5 | −95.2500 | 0.50 |  |  | 34.20 |
| 6 | Infinity | 3.80 | 1.61310 | 44.36 | 34.50 |
| 7 | 115.8000 | 4.25 | 1.45600 | 90.34 | 34.50 |
| 8 | −119.6000 | 39.00 |  |  | 34.70 |
| 9 | 95.2603 | 3.00 | 1.61310 | 44.36 | 38.00 |
| 10 | 43.0696 | 7.00 | 1.49695 | 81.60 | 38.00 |
| 11 | −175.2769 | 0.50 |  |  | 38.00 |
| 12 | 45.0330 | 3.00 | 1.61310 | 44.36 | 38.00 |
| 13 | 33.8820 | 6.50 | 1.45600 | 90.34 | 38.00 |
| 14 | 157.5993 | 13.79 |  |  | 38.00 |
| STOP | Infinity | 11.00 |  |  |  |
| 16 | −96.3272 | 1.60 | 1.80080 | 35.00 | 10.00 |
| 17 | −11.0564 | 1.00 | 1.78574 | 44.20 | 10.00 |
| 18 | 29.4655 | 10.97 |  |  | 10.00 |
| 19 | −97.0317 | 1.00 | 1.78574 | 44.20 | 10.00 |
| 20 | 5.4658 | 3.25 | 1.80080 | 35.00 | 10.00 |
| 21 | 26.7295 | 51.75 |  |  | 10.00 |
| 22 | 730.8634 | 6.00 | 1.61262 | 58.70 | 40.00 |
| 23 | −56.0953 | 0.50 |  |  | 40.00 |
| 24 | 123.3747 | 8.00 | 1.48749 | 70.21 | 40.00 |
| 25 | −52.4897 | 3.00 | 1.80610 | 33.27 | 40.00 |
| 26 | −258.4570 | 5.00 |  |  | 40.00 |
| 27 | 697.4209 | 5.00 | 1.64839 | 53.00 | 41.00 |
| 28 | −78.9875 | 3.00 | 1.80518 | 25.39 | 41.00 |
| 29 | −223.3974 | 0.50 |  |  | 41.00 |
| 30 | 156.2192 | 4.00 | 1.72904 | 54.70 | 41.00 |
| 31 | −1479.0530 | 127.51 |  |  | 41.00 |

IMA Zoom Data

|  | 0.75x | 1.33x | 2.00x | 4.22x | 7.50x |
|---|---|---|---|---|---|
| S15 | 11 | 21.317 | 26.16429 | 29.96268 | 30.12291 |
| S18 | 10.96782 | 4.999894 | 5.663429 | 16.85393 | 32.59501 |
| S21 | 51.74994 | 47.40086 | 41.88991 | 26.90104 | 10.99979 |

Configuration 2 has a negative positive zoom group with a working f-number of 20 and a camera format of ½ inch.

In the second configuration, surfaces 1 to 8 are the first collimator FC, surfaces 9 to 13 are the first decollimator FD, surfaces 15 to 19 are the variator V in the zoom group, surfaces 20–25 are the compensator C in the zoom group and surfaces 27 to 29 are the second decollimator SD. This coguration does not employ a second collimator SC as the compensator C pull out collimated light.

| Surface | Radius | Thickness | Nd | V# | Diameter |
|---|---|---|---|---|---|
| OBJ |  | 77.34 |  |  |  |
| 1 | −283.7479 | 4.00 | 1.45600 | 90.34 | 34.00 |
| 2 | −57.4479 | 0.50 |  |  | 34.00 |
| 3 | Infinity | 2.50 | 1.61310 | 44.36 | 34.80 |
| 4 | 103.1262 | 5.00 | 1.45600 | 90.34 | 34.80 |
| 5 | −92.3134 | 0.50 |  |  | 35.20 |
| 6 | Infinity | 2.50 | 1.61310 | 44.36 | 35.60 |
| 7 | 115.3065 | 5.00 | 1.45600 | 90.34 | 35.60 |
| 8 | −124.7165 | 35.80 |  |  | 35.60 |
| 9 | 66.9775 | 5.00 | 1.55220 | 67.03 | 35.00 |
| 10 | −93.1287 | 3.00 | 1.65412 | 39.62 | 35.00 |
| 11 | 182.9913 | 0.50 |  |  | 34.90 |
| 12 | 62.7445 | 4.00 | 1.49695 | 81.60 | 33.50 |
| 13 | 121.7067 | 22.92 |  |  | 33.50 |
| STOP | Infinity | 0.00 |  |  |  |
| 15 | 15.9237 | 2.00 | 1.78785 | 47.40 | 11.00 |
| 16 | 5.1692 | 2.50 | 1.80080 | 35.00 | 9.00 |
| 17 | 12.2617 | 1.30 |  |  | 8.00 |
| 18 | −17.6645 | 2.00 | 1.77236 | 49.60 | 9.40 |
| 19 | 59.5758 | 41.51 |  |  | 9.40 |
| 20 | −255.2385 | 4.50 | 1.78574 | 44.20 | 27.80 |
| 21 | −29.2736 | 3.50 | 1.84635 | 23.80 | 28.50 |
| 22 | −63.5616 | 0.50 |  |  | 31.00 |

-continued

| | | | | | |
|---|---|---|---|---|---|
| 23 | 262.2000 | 4.10 | 1.69350 | 53.33 | 30.80 |
| 24 | −37.2864 | 2.50 | 1.75487 | 52.30 | 29.30 |
| 25 | −147.4509 | 45.91 | | | 31.50 |
| 26 | Infinity | 3.00 | | | 29.00 |
| 27 | 185.5856 | 4.25 | 1.61791 | 63.40 | 33.00 |
| 28 | −57.9111 | 2.50 | 1.80610 | 33.27 | 33.00 |
| 29 | −121.8555 | 148.67 | | | 33.50 |

IMA Zoom Data

| | 0.80x | 1.44x | 2.50x | 4.50x | 7.90x |
|---|---|---|---|---|---|
| S14 | 0.0000 | 32.94485 | 50.92825 | 61.57181 | 67.20934 |
| S19 | 41.51364 | 38.24532 | 32.50898 | 21.85882 | 3.980362 |
| S25 | 45.91399 | 16.23737 | 3.995184 | 3.998487 | 16.23795 |

Configuration 3 has a negative positive zoom group with a working f-number of 20 in a camera format of ½ inch.

In the third configuration, surfaces 1 to 8 are the first collimator FC, surfaces 9 to 13 are the first decollimator FD, surfaces 15 to 17 are the variator V of the zoom group, surfaces 18–21 are the compensator C in the zoom group, surfaces 22 to 24 are the second collimator SC and surfaces 25 to 27 are the second decollimator SD.

| Surface | Radius | Thickness | Nd | V# | Diameter |
|---|---|---|---|---|---|
| OBJ | | 78.39 | | | |
| 1 | −293.2219 | 4.00 | 1.52855 | 76.98 | 36.00 |
| 2 | −61.5946 | 0.50 | | | 36.00 |
| 3 | Infinity | 2.50 | 1.61310 | 44.36 | 36.00 |
| 4 | 104.8174 | 5.00 | 1.49695 | 81.60 | 36.00 |
| 5 | −94.0966 | 0.50 | | | 36.00 |
| 6 | Infinity | 2.50 | 1.61310 | 44.36 | 36.00 |
| 7 | 72.8788 | 5.00 | 1.49695 | 81.60 | 36.00 |
| 8 | −188.2986 | 41.80 | | | 36.00 |
| 9 | 73.2881 | 5.00 | 1.49695 | 81.60 | 34.00 |
| 10 | −125.6413 | 2.50 | 1.80349 | 30.40 | 34.00 |
| 11 | −462.3412 | 0.50 | | | 34.00 |
| 12 | 94.6181 | 5.00 | 1.48656 | 84.47 | 34.00 |
| 13 | 230.8875 | 18.63 | | | 34.00 |
| STOP | Infinity | 3.56 | | | |
| 15 | −27.6135 | 2.25 | 1.80318 | 46.38 | 9.00 |
| 16 | 6.9900 | 2.75 | 1.85025 | 32.17 | 9.00 |
| 17 | 24.2769 | 41.67 | | | 9.00 |
| 18 | −505.7763 | 2.00 | 1.79935 | 42.20 | 21.00 |
| 19 | −118.3258 | 5.00 | 1.69680 | 55.41 | 21.00 |
| 20 | −26.3939 | 3.50 | 1.80349 | 30.40 | 21.00 |
| 21 | −47.4743 | 32.89 | | | 22.00 |
| 22 | 87.2833 | 5.00 | 1.79619 | 43.20 | 29.00 |
| 23 | −53.8974 | 2.75 | 1.87800 | 38.48 | 29.00 |
| 24 | 140.8270 | 1.00 | | | 29.00 |
| 25 | 142.0000 | 3.75 | 1.58304 | 59.40 | 29.00 |
| 26 | −62.2000 | 2.25 | 1.66663 | 33.00 | 29.00 |
| 27 | −203.0000 | 164.00 | | | 29.00 |

IMA Zoom Data

| | 080x | 1.42x | 2.53x | 4.50x | 8.00x |
|---|---|---|---|---|---|
| S14 | 3.564761 | 29.43371 | 44.92315 | 53.94762 | 59.06097 |
| S17 | 41.66636 | 38.75392 | 32.98541 | 22.17358 | 1.999626 |
| S21 | 32.88991 | 9.933404 | 0.212473 | 1.999916 | 17.06044 |

Configuration 4 has a negative-negative zoom group with a working f-number of 20 in a camera format: ½ inch.

In the fourth configuration, surfaces 1 to 8 are the first collimator FC, surfaces 9 to 13 are the first decollimator FD, surfaces 16 to 18 are the variator V in the zoom group, surfaces 19–21 are the compensator C in the zoom group, surfaces 22 to 27 are the second collimator SC and surfaces 28 to 30 are the second decollimator SD.

| Surface | Radius | Thickness | Nd | V# | Diameter |
|---|---|---|---|---|---|
| OBJ | | 77.19 | | | |
| 1 | −281.5500 | 4.00 | 1.45600 | 90.34 | 32.00 |
| 2 | −57.2600 | 0.50 | | | 33.00 |
| 3 | Infinity | 3.80 | 1.61310 | 44.36 | 34.00 |
| 4 | 103.6500 | 4.25 | 1.45600 | 90.34 | 34.00 |
| 5 | −95.2500 | 0.50 | | | 34.20 |
| 6 | Infinity | 3.80 | 1.61310 | 44.36 | 34.50 |
| 7 | 115.8000 | 4.25 | 1.45600 | 90.34 | 34.50 |
| 8 | −119.6000 | 45.00 | | | 34.70 |
| 9 | 175.8591 | 6.00 | 1.48656 | 84.47 | 34.00 |
| 10 | −68.5279 | 4.00 | 1.61293 | 36.96 | 34.00 |
| 11 | −399.7037 | 0.50 | | | 34.00 |
| 12 | 66.4254 | 4.00 | 1.48656 | 84.47 | 34.00 |
| 13 | −1219.1600 | 17.31 | | | 32.00 |
| STOP | Infinity | 0.00 | | | |
| 15 | Infinity | 49.20 | | | |
| 16 | −62.6972 | 2.25 | 1.80400 | 46.57 | 12.00 |
| 17 | 17.6723 | 2.75 | 1.76182 | 26.52 | 12.00 |
| 18 | 71.3495 | 22.97 | | | 12.00 |
| 19 | −58.4378 | 4.00 | 1.82223 | 37.45 | 10.00 |
| 20 | −6.0108 | 2.50 | 1.81550 | 44.54 | 10.80 |
| 21 | 52.7099 | 7.00 | | | 13.00 |
| 22 | 735.5523 | 6.25 | 1.75500 | 52.32 | 38.00 |
| 23 | −44.2291 | 4.25 | 1.80349 | 30.40 | 39.00 |
| 24 | −61.6877 | 0.50 | | | 40.00 |
| 25 | 155.5579 | 6.71 | 1.61800 | 63.33 | 40.00 |
| 26 | −52.9482 | 3.50 | 1.83400 | 37.16 | 40.00 |
| 27 | 15685.880 | 5.00 | | | 40.00 |
| 28 | 89.3700 | 4.00 | 1.80440 | 39.59 | 40.00 |
| 29 | 51.8700 | 6.50 | 1.52855 | 76.98 | 40.00 |
| 30 | −195.0000 | 153.11 | | | 40.00 |

IMA Zoom Data

| | 0.75x | 1.33x | 2.00x | 4.22x | 7.50x |
|---|---|---|---|---|---|
| S15 | 11.0000 | 27.8863 | 37.0673 | 47.0086 | 49.1975 |
| S18 | 24.7087 | 10.1201 | 5.0000 | 9.1381 | 22.9692 |
| S21 | 43.4578 | 41.1600 | 37.0992 | 23.0198 | 6.9999 |

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed:

1. A telecentric zoom lens, comprising:
   (a) a first collimator located on an optical axis;
   (b) a first decollimator on the optical axis rearward of the first collimator;
   (c) a zoom group on the optical axis rearward of the first decollimator;
   (d) a second decollimator rearward of the zoom group; and
   (e) a telecentric forming aperture on the optical axis optically intermediate the first decollimator and the zoom group.

2. The telecentric zoom lens of claim 1, further comprising a second collimator optically intermediate the zoom group and the second decollimator.

3. The telecentric zoom lens of claim 1, wherein the zoom group includes a variator and a compensator.

4. The telecentric zoom lens of claim 1, wherein the telecentric forming aperture is a variable aperture.

5. A lens system, comprising:
   (a) a zoom group having a first and a second optical element moveable along optical axis;
   (b) an objective lens on a front side of the zoom group; and
   (c) an aperture located on the optical axis and optically intermediate the zoom group and the objective lens to create telecentricity on the object side of the lens system.

6. The lens system of claim 5, wherein the aperture is of variable diameter.

7. The lens system of claim 5, wherein the aperture maintains a constant speed on an image side of the lens system.

8. The lens system of claim 5, wherein optical surfaces in the zoom group and the objective lens are selected to substantially preclude vignetting.

9. The lens system of claim 5, wherein the first optical element in the zoom group is negative and the second optical element in the zoom group is positive.

10. The lens system of claim 5, wherein the first optical element of the zoom group is negative and the optical element of the second zoom group is negative.

11. The lens system of claim 5, further comprising a collimator optically rearward of the zoom group.

12. The lens system of claim 11, wherein the collimator is selected to reduce distortion of the lens system.

13. The lens system of claim 5, wherein the aperture is optically intermediate the objective lens and a nearest zoom group optical element.

14. The lens system of claim 5, further comprising a first decollimator optically intermediate the objective lens and the zoom group.

15. A telecentric lens system, comprising:
   (a) an objective lens having an object side and an image side, the objective lens located on an optical axis;
   (b) a zoom lens moveable along the optical axis on the image side of the objective lens; and
   (c) a telecentricity forming stop at a fixed position on the optical axis optically intermediate the objective lens and the zoom lens.

16. The telecentric lens system of claim 15, wherein the telecentricity forming stop includes a variable aperture.

17. The telecentric lens system of claim 15, wherein the position of the telecentricity forming stop on the optical axis is spaced from a range of movement of the zoom lens.

* * * * *